United States Patent [19]

Barnes

[11] Patent Number: 4,542,861
[45] Date of Patent: Sep. 24, 1985

[54] REEL DRIVE MECHANISM

[75] Inventor: Ronald L. Barnes, West Des Moines, Iowa

[73] Assignee: Albert L. Anderson, Cumming, Iowa

[21] Appl. No.: 577,052

[22] Filed: Feb. 6, 1984

[51] Int. Cl.⁴ .................... B65H 17/08; B65H 75/40
[52] U.S. Cl. .................................. 242/86.5 R; 242/66
[58] Field of Search .............. 242/86.5 R, 86.6, 54 R, 242/66; 414/546, 501

[56] References Cited

U.S. PATENT DOCUMENTS

| | | | |
|---|---|---|---|
| 3,325,118 | 6/1967 | Hall | 242/86.5 R |
| 3,625,380 | 12/1971 | Anderson | 414/546 |
| 3,851,832 | 12/1974 | Krueckels et al. | 242/66 |
| 3,902,612 | 9/1975 | Hall | 242/86.5 R X |
| 4,102,512 | 7/1978 | Lewallyn | 242/66 |
| 4,139,166 | 2/1979 | Powell et al. | 242/66 |
| 4,228,967 | 10/1980 | Woodruff | 242/86.5 R |

Primary Examiner—Stuart S. Levy
Assistant Examiner—Lynn M. Sohacki
Attorney, Agent, or Firm—Rudolph L. Lowell

[57] ABSTRACT

A reel drive mechanism for use with a reel handling apparatus having a pair of lift arms carried by a vehicle for portable transportation. The reel driving mechanism includes a base frame upon which is mounted an upright roller drive assembly pivotal about an axis transverse to the vehicle. An upper drive roller and a lower drive roller are supported by the upright roller assembly and are rotatable about axes parallel to said transverse axis with the upper roller arranged forwardly of the lower roller. The reel handling apparatus may drivably engage the peripheral surface of a single larger reel or a pair of smaller reels upon the rollers. The upright roller assembly pivots to maintain frictional engagement of both rollers with the reel supported by the reel handling apparatus.

4 Claims, 7 Drawing Figures

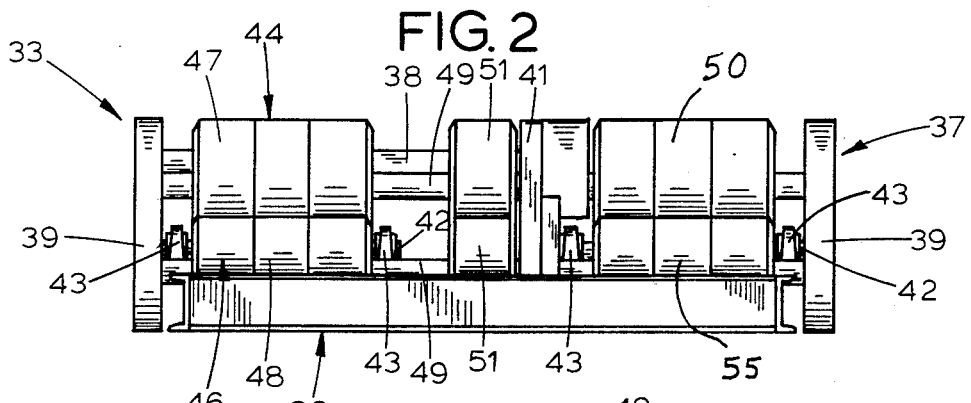
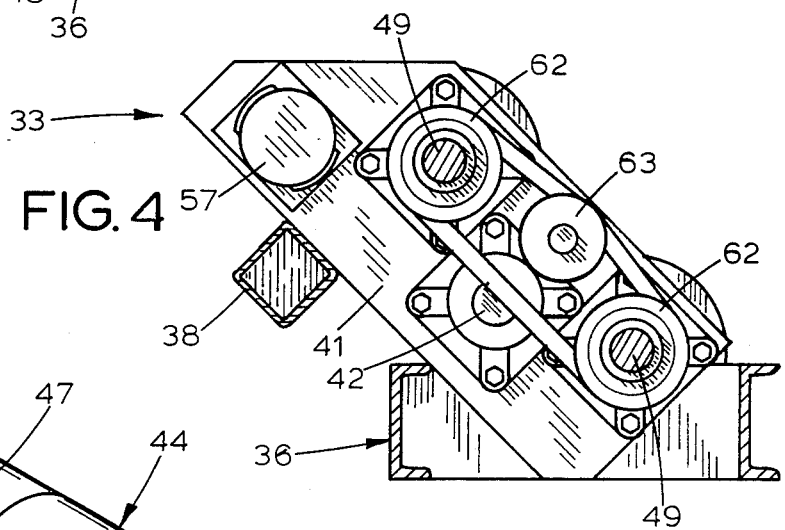
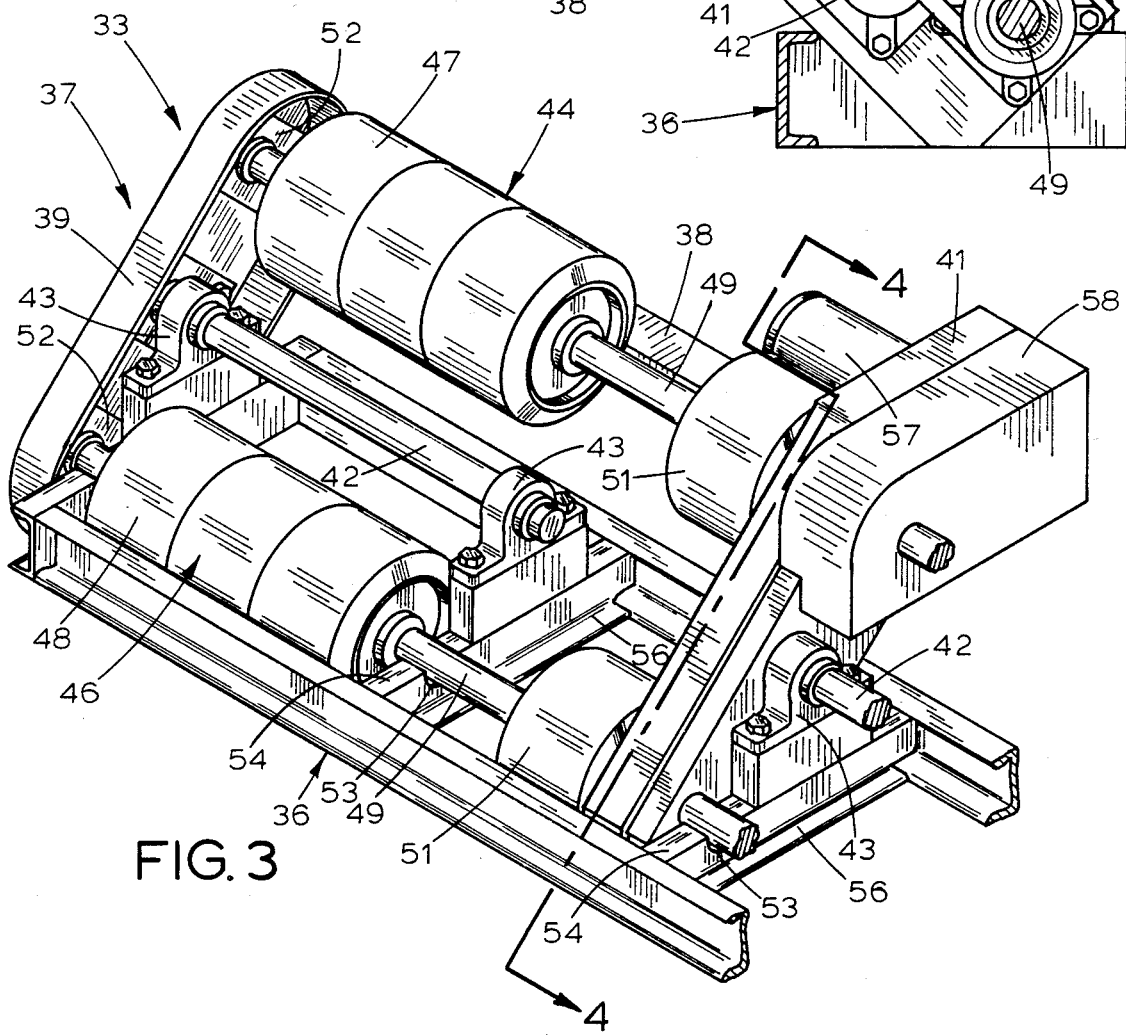

REEL DRIVE MECHANISM

BACKGROUND OF THE INVENTION

1. Field of the Invention

The invention relates to mechanisms for winding and unwinding a cable reel and, more particularly, to a reel drive mechanism for use on a transport vehicle having a reel handling apparatus.

2. Background Summary

Wide use is made in the utility field of cable which is wound on reels for easy storage and transportation. These reels vary in size and are transported to job sites on trucks having reel loading and unloading apparatus. An example of such a reel loading and unloading apparatus is disclosed in U.S. Pat. No. 3,625,380.

As is known, a reel is generally supported by a shaft or spindle inserted through the center thereof. The cable on a reel may thus be unwound by supporting the wheel for rotation on the spindle and then pulling the cable from the reel. Similarly, cable may be wound onto the reel by driving the rotatable reel. The reel drive mechanism of the present invention is adapted for use on trucks having a reel loading apparatus such as that taught by U.S. Pat. No. 3,625,380, to wind and unwind cable while the reel is carried on such apparatus and is automatically adjustable to drive large or small reels. U.S. Pat. No. 3,325,118 discloses a single, fixed roller for driving a reel.

SUMMARY OF THE INVENTION

The reel drive mechanism of the present invention is used with a vehicle having a reel loading and unloading apparatus with pivoted lift arms supported adjacent the rear end of the vehicle for lifting a cable reel from an unloaded, ground supported position to a loaded transport position. The reel drive mechanism is positioned on the vehicle bed forwardly of the reel lift arms in the reel transport positions therefor. A pair of parallel roller assemblies having longitudinal axes extended transversely of the vehicle are carried on a tiltable or adjustable frame that is supported for pivotal movement, fore and aft of the vehicle, about a transverse shaft mounted on a base frame secured to the vehicle bed.

With the lift arms in a transport position, the reel is movable on the lift arms into frictional engagement with one of the roller assemblies whereby the tiltable frame is pivoted to frictionally engage both roller assemblies with the reel. The roller assemblies are driven by a hydraulic motor supported on the tiltable frame to provide for a reversible rotation of the roller assemblies to either wind or unwind the cable. The drive roller assemblies are adapted to drive a single large reel or a pair of small reels.

BRIEF DESCRIPTION OF THE DRAWING

FIG. 2 is a rear elevational view of the reel drive mechanism;

FIG. 3 is an enlarged detail perspective view of the reel drive mechanism showing the relative assembly of the base frame and tiltable frame therefor;

FIG. 4 is a reduced cross-sectional view of the reel drive mechanism taken along line 4—4 of FIG. 3 showing the drive train for the reel drive roller assemblies;

DETAILED DESCRIPTION OF THE PREFERRED EMBODIMENT

Figure 1:
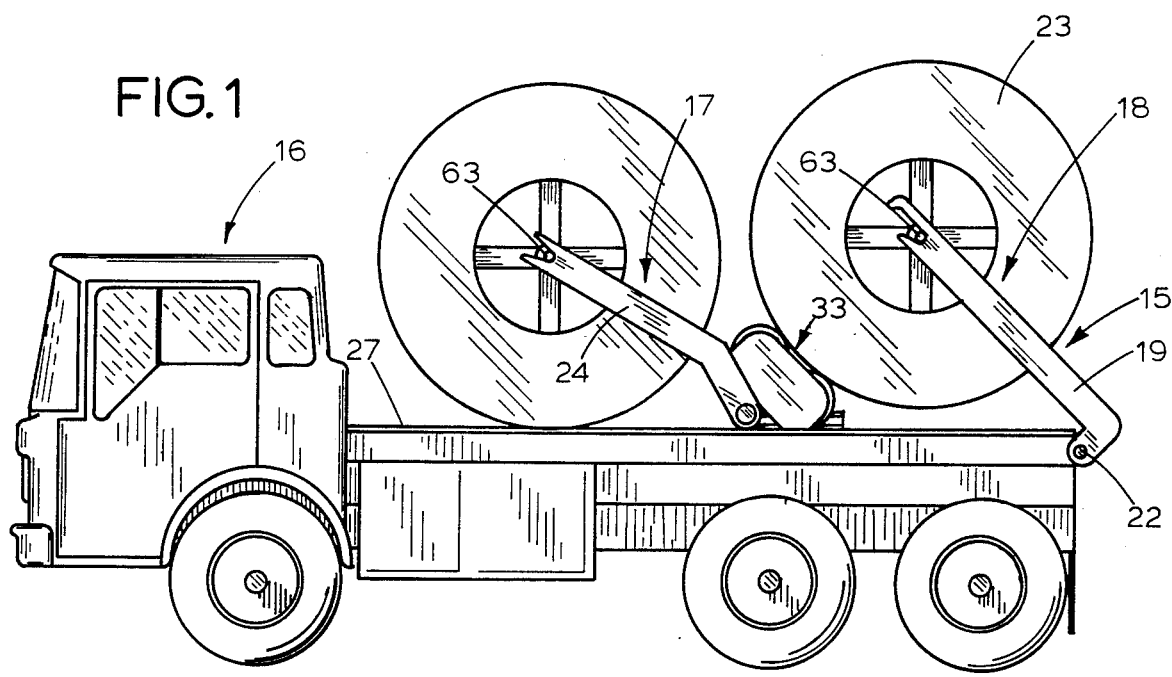
FIG. 1 is a side elevational view of a vehicle equipped with a reel loading apparatus and the reel driving mechanism of this invention, and wherein a reel in a transport position on the loading apparatus is illustrated in driven engagement with the drive mechanism.

Referring to FIG. 1, there is illustrated a reel loading apparatus 15 mounted on the chassis of a vehicle 16 and including a front reel loader 17 and a rear reel loader 18. The rear reel loader 18 (FIG. 7) includes three rear lift arms 19 mounted on a rock shaft 22 rotatably supported on the rear end of the vehicle chassis for rotation about a transverse axis for pivotal movement from a reel loading position inclined downwardly and rearwardly from the vehicle to a reel transport position projected upwardly and forwardly from the vehicle rear end. In the transport position a reel, indicated at 23 (FIG. 1), may be transferred from the rear lift arms 19 to the lift arms 24 of the front reel loader 17. The rear lift arms (FIG. 7) are pivotally moved by hydraulic cylinder assemblies 26, supported on the vehicle chassis below the deck 27 and connected with the rock shaft 22 through a linkage system 28. Hydraulic cylinder assemblies 29 rotate a rock shaft 31 on which the front lift arms 24 are mounted. The cylinder assemblies are supplied with fluid under pressure from a fluid source (not shown) on the vehicle and are operated by a valve control unit 32 carried adjacent the rear of the vehicle for convenient access by the vehicle operator.

The center one of the front lift arms 24 and the center one of the rear lift arms 19 are detachably mounted on the rock shafts 31 and 27, respectively, and are removed from the reel loading apparatus in the handling of large cable reels and are used only when small reels are to be loaded. For a more detailed description of the reel loader apparatus 15 reference is made to U.S. Pat. No. 3,625,380, which is to be incorporated herein by such reference.

The reel drive mechanism 33 of this invention (FIG. 1) is mounted on the vehicle bed or deck 27 forwardly of the rear lift arms 19 in the reel transport position therefor and adjacent the front lift arms 24. The reel drive mechanism 33 (FIGS. 2 and 3) consists of a base frame 36 of a generally rectangular shape extended transversely of the vehicle 12 and secured to the vehicle deck 27. A tiltable frame 37 is pivotally supported on the base frame 36 for tilting movement in a direction fore and aft of the vehicle about an axis extended transversely of the vehicle. The tiltable frame includes a longitudinal upper frame member 38 having laterally downwardly and rearwardly projected end support arms 39 and a central support arm 41. The tiltable frame 37 is mounted for a rocking or pivotal movement on the base frame 36 by a pair of coaxial shafts 42 having a common axis parallel to the upper frame member 38. Each coaxial shaft 42 is carried in bearing units 43 arranged to opposite sides of the center support arm 41 and has the outer end portion thereof secured to an arm 39 at a position intermediate the ends thereof.

Extended longitudinally of the tiltable frame 37 and to opposite sides of the coaxial shafts 42 and in a parallel arrangement therewith and between the support arms 39 and 41 are a pair of roller assemblies 44 and 46 hereinafter to be referred to as an upper roller assembly and lower roller assembly, respectively. The roller assemblies 44 and 46 carry transversely opposite rubber roller units 47 and 48 mounted on shafts 49 at positions adjacent one of the end support arms 39. Each rubber roller unit 47 and 48 has an axial length substantially equal to the length of a pivot shaft 42. Also, mounted opposite each other on the shafts 49 are rubber roller units 51 arranged to one side of and adjacent to the center support arm 41 and of a reduced axial length relative to the rubber roller units 47 and 48.

Also mounted on the shafts 49 of the roller assemblies 44 and 46 between the support arm 41 and the other end of the end support arms 39, at positions adjacent the other support arm 39, are a pair of rubber roller units 50 and 55 similar to the rubber roller units 47 and 48, respectively. As illustrated, a rubber roller unit 51 has an axial length equal to approximately one-third the axial length of a rubber roller unit 47, 48 or 50, 55.

Each shaft 49 of a roller assembly 44 or 46 has the ends thereof rotatably supported adjacent corresponding ends of the end support arms 39, in bearing units, indicated at 52, (FIG. 3). A central portion of each shaft 49 is rotatably supported on the central arm 41.

The tiltable frame 37 is maintained in a generally upright position, for rocking or tilting movement thereof, fore and aft of the vehicle 12, between limits defined by the engagement of the shaft 49 of the lower roller assembly 46 within notches 53 formed adjacent the rear ends 54 of transverse brace members 56 of the base frame 36 (FIG. 3) and engagement of the central support arm 41 with a portion of the base frame 36 (FIG. 4). This limited tilting movement of the frame 37 takes place within a range of about fifteen degrees or less.

The roller assemblies 44 and 46 are driven by a hydraulic motor 57 mounted on a housing 58 which is carried on the central support arm 41 (FIGS. 3 and 4). A drive pulley (not shown) of the motor 57 is in a belt driven relation with driven pulleys 62 (FIG. 4) mounted on the shafts 49 of the roller assemblies 44 and 46 with a belt tensioning or idler pulley being indicated at 63. It is seen, therefore, that the power transmission system for the roller assemblies 44 and 46 is carried on the center support arm 41 and within the housing 58 so as to be movable as a unit with the roller assemblies and the tiltable frame 37. Fluid under pressure is supplied to the hydraulic motor 57 from the source of supply utilized for the cylinder assemblies 26 and 29 of the reel loader apparatus, and with the operation of the hydraulic motor being under the control of the valve unit 32.

Figures 5, 6:
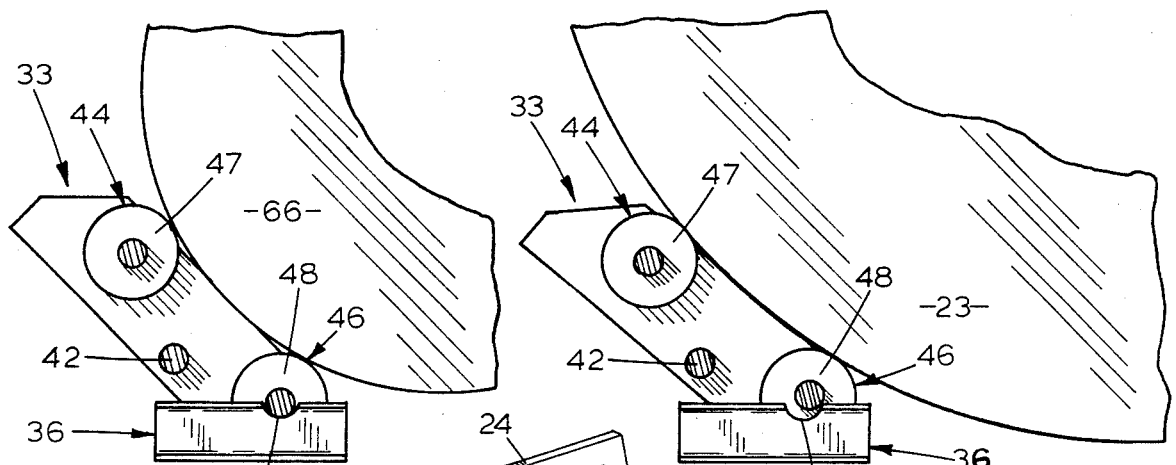
FIG. 5 is a diagrammatic view showing the reel drive mechanism in frictional engagement with a large reel.
FIG. 6 is illustrated similarly to FIG. 7 and shows the reel drive mechanism in frictional engagement with a small reel.

In the operation of the reel driving mechanism 33, let it be assumed that a large reel 23, as shown in FIGS. 1 and 5, and having a diameter of about ninety-six inches, is to be supported for the unwinding of cable therefrom. With the center ones of the lift arms 19 and 24 of the reel loader apparatus 15 removed, the arms 19 are extended downwardly and rearwardly from the vehicle 12 for lifting engagement with the ground supported large reel 23. On actuation of the hydraulic cylinder assemblies 26, the reel 23 is elevated to its transport position shown in FIG. 1 and into engagement with the reel drive mechanism 33. Initial engagement of the reel end plates may take place with either one or the other of the roller assemblies 44 or 46 at the rubber roller units 47 and 50 or and 48 and 55. In response to this initial engagement, the frame 37 is tilted in a direction providing for the engagement of the reel end plates with the other one of the roller assemblies.

As illustrated in FIG. 5, when thus engaged with both of the roller assemblies 44 and 46 in positions on the rubber roller units 47, 48 and 50, 55, the frictional pressure between the reel end plates and the roller assemblies may be increased or decreased in response to actuation of the cylinder assemblies 26. The hydraulic motor 57 is of a reversible type so that with the reel 23 in frictional engagement with the roller assemblies 44 and 46 cable may be either wound on or unwound from the reel 23.

Figure 7:
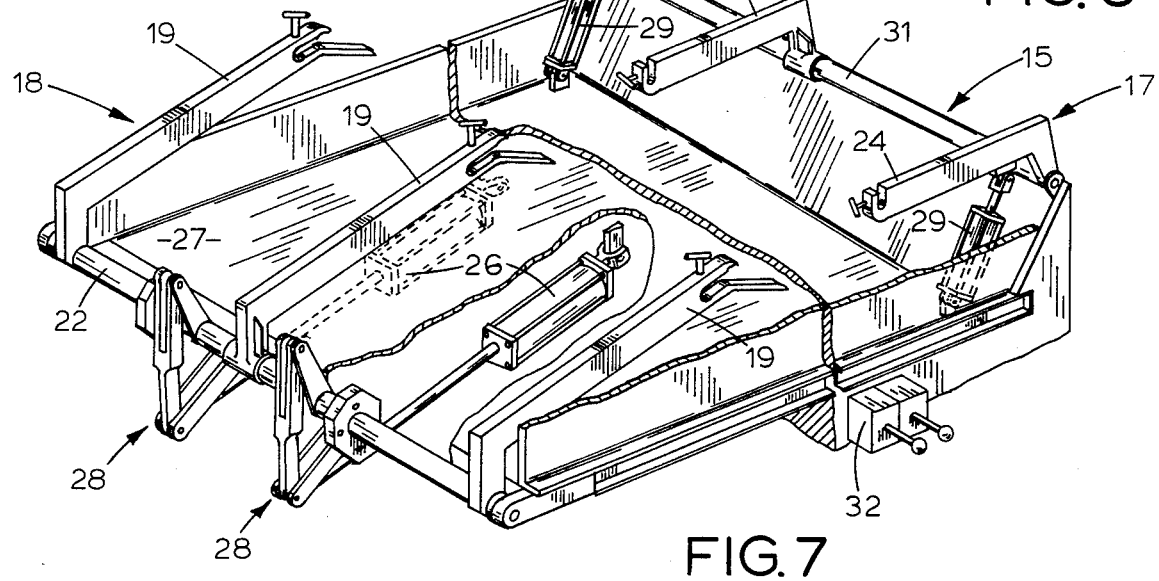
FIG. 7 is a rear foreshortened perspective view of the reel loading apparatus showing the structural arrangement of three lift arms for handling either a pair of small reels or a large reel.

For use with a small reel of about forty-two inches in diameter, having a correspondingly reduced axial length relative to a large reel of ninety-six inches in diameter, the reel loading apparatus 15 is provided with the detachable center arm 19 (FIG. 7). With the center arm attached either one or two small reels 66 (FIG. 6) may be loaded and moved to transport positions on the vehicle 12. When a pair of small reels are to be driven, the center one of the lift arms 19 will support the adjacent ends of the reel spindles 63 (FIG. 1). When a single small reel 66 is in a transport position, the end plates thereof are moved into frictional engagement with the rubber roller unit 51 and either one or the other pair of the rubber roller units 47, 48 or 50, 55. When two small reels are to be driven the adjacent inner end plates of the reels will frictionally engage the rubber roller units 51 and their outer end plates the wide rubber roller units 47, 48 and 50, 55.

As clearly appears from a comparison of FIGS. 5 and 6, a tiltable movement of the frame 37 for operative engagement with either a large reel or a small reel is of a relatively small degree. Although the use of the reel driving mechanism has been illustrated with respect to the large reel 23 and small reel 66 it is apparent that any size reel between the diameters of forty-two and ninety-six inches may be efficiently driven with a reduced frictional pressure by virtue of the dual engagement of the rubber roller units at spaced positions on the periphery of the end plates of a reel. It is also seen that this dual engagement takes place automatically in response to the adjustment of the tiltable frame by engagement with a reel to be driven.

Although the invention has been described with respect to a preferred embodiment thereof, it is to be understood that it is not to be so limited since changes and modifications can be made therein within the full intended scope of the invention as defined in the appended claims.

I claim:

1. A reel drive mechanism for a reel handling apparatus mountable on the chassis of a vehicle and including pivoted lift arms having reel supporting means at the free ends thereof and pivotally supported adjacent the rear end of the vehicle for pivoted up and down movement from first reel loading positions inclined downwardly and rearwardly from said rear end to second reel transport positions projected upwardly and forwardly from said rear end, said mechanism comprising:

(a) a base frame mounted transversely of said chassis forwardly of said lift arms in the second positions therefor;

(b) a transversely extended upright tiltable frame structure pivotally mounted on said base frame for upwardly and forwardly tilting movements about the longitudinal axis thereof, (c) a pair of roller assemblies rotatably mounted on said tiltable frame to opposite sides of said longitudinal axis whereby, when said lift arms with a reel supported thereon are movable to the second positions therefor, said reel is initially moved into frictional engagement with a first one of said roller assemblies to tilt said tiltable frame for frictional engagement of the reel also with the second one of said assemblies; and (d) means on said tiltable frame for driving said roller assemblies.

2. The reel drive mechanism according to claim 1, wherein:

(a) said roller assemblies frictionally engage the reel at positions therebetween forwardly of said reel supporting means.

3. The reel drive mechanism according to claim 6, wherein:

(a) said roller assemblies are tiltable as a unit with said upright frame into frictional engagement with reels of varying diameters carried on said reel supporting means.

4. The reel drive mechanism according to claim 1, wherein:

(a) said drive means includes means connecting one of said roller assemblies in a drive relation with the other of said roller assemblies, and a power unit for driving said one roller assembly.

* * * * *